(12) United States Patent
Wang et al.

(10) Patent No.: US 8,989,362 B2
(45) Date of Patent: *Mar. 24, 2015

(54) METHOD, SYSTEM, AND APPARATUS FOR OVERRIDING A RING BACK SIGNAL

(75) Inventors: Jingxin Wang, Beijing (CN); Bing Li, Shanghai (CN); Jian Yuan, Beijing (CN); Can Feng Chen, Beijing (CN)

(73) Assignee: Core Wireless Licensing, S.a.r.l., Luxembourg (LU)

( * ) Notice: Subject to any disclaimer, the term of this patent is extended or adjusted under 35 U.S.C. 154(b) by 258 days.

This patent is subject to a terminal disclaimer.

(21) Appl. No.: 13/491,481

(22) Filed: Jun. 7, 2012

(65) Prior Publication Data

US 2012/0250847 A1    Oct. 4, 2012

Related U.S. Application Data

(63) Continuation of application No. 12/231,454, filed on Sep. 3, 2008, now Pat. No. 8,204,200.

(51) Int. Cl.
*H04M 3/42* (2006.01)
*H04M 11/00* (2006.01)
*H04M 1/64* (2006.01)
*H04M 1/725* (2006.01)

(52) U.S. Cl.
CPC ...... *H04M 1/72522* (2013.01); *H04M 1/72558* (2013.01); *H04M 3/42017* (2013.01)
USPC ............... 379/207.16; 348/14.01; 348/14.02; 348/14.03; 379/88.13; 379/88.17; 455/412.2; 455/414.1; 455/567

(58) Field of Classification Search
CPC ....... H04W 8/18; H04M 19/026; H04N 7/147
USPC ............ 379/207.16, 88.13, 88.17; 455/412.2, 455/414.1, 567; 348/14.01, 14.02, 14.03
See application file for complete search history.

(56) References Cited

U.S. PATENT DOCUMENTS

| | | | |
|---|---|---|---|
| 7,010,112 B2 * | 3/2006 | Lee et al. | 379/207.16 |
| 7,242,756 B2 * | 7/2007 | Hahm et al. | 379/207.16 |
| 7,248,851 B2 * | 7/2007 | Lee et al. | 455/401 |
| 7,471,783 B1 | 12/2008 | Shen et al. | |
| 7,486,971 B2 | 2/2009 | Awada et al. | |
| 7,817,993 B2 | 10/2010 | Kim | |
| 7,831,462 B2 | 11/2010 | Colson et al. | |
| 7,844,485 B2 | 11/2010 | Colson et al. | |
| 7,912,198 B2 * | 3/2011 | Zhang et al. | 379/207.16 |
| 8,170,194 B2 * | 5/2012 | Shen et al. | 379/207.16 |
| 8,326,273 B2 * | 12/2012 | Shang et al. | 455/414.1 |
| 2005/0107075 A1 | 5/2005 | Snyder | |
| 2005/0243989 A1 * | 11/2005 | Lee et al. | 379/207.16 |

(Continued)

FOREIGN PATENT DOCUMENTS

| | | |
|---|---|---|
| CN | 1604601 | 4/2005 |
| CN | 1645883 | 7/2005 |

(Continued)

*Primary Examiner* — Lisa Hashem (57) ABSTRACT

Overriding a ring back signal involves receiving a ring back signal at a communications apparatus from a communication network in response to a user-initiated connection request. The ring back signal is rendered to a user of the communications apparatus, and a user input is received at the communications device to override the ring back signal. An alternate output is rendered to the user in place of the ring back signal.

25 Claims, 6 Drawing Sheets

(56) References Cited

U.S. PATENT DOCUMENTS

| | | | |
|---|---|---|---|
| 2006/0109970 A1 | 5/2006 | Shim et al. | |
| 2006/0258340 A1 | 11/2006 | Eronen | |
| 2006/0264225 A1 | 11/2006 | No et al. | |
| 2007/0077918 A1 | 4/2007 | Nguyen et al. | |
| 2007/0121821 A1* | 5/2007 | Su | 379/88.13 |
| 2007/0207782 A1 | 9/2007 | Tran | |
| 2007/0223663 A1 | 9/2007 | Benco et al. | |
| 2007/0280450 A1* | 12/2007 | Wang | 379/142.01 |
| 2007/0286402 A1 | 12/2007 | Jacobson | |
| 2008/0026731 A1* | 1/2008 | Park et al. | 455/414.1 |
| 2008/0037740 A1 | 2/2008 | Yoakum et al. | |
| 2008/0102800 A1* | 5/2008 | Cheng et al. | 455/412.2 |
| 2008/0108334 A1 | 5/2008 | Wang et al. | |
| 2008/0130841 A1 | 6/2008 | Pan et al. | |
| 2008/0192900 A1* | 8/2008 | Liu | 379/87 |
| 2009/0104944 A1 | 4/2009 | Awada et al. | |
| 2009/0185669 A1 | 7/2009 | Zitnik et al. | |
| 2010/0022226 A1 | 1/2010 | Yang et al. | |
| 2010/0104082 A1 | 4/2010 | Ke et al. | |
| 2010/0151824 A1* | 6/2010 | Shang et al. | 455/411 |
| 2010/0323676 A1* | 12/2010 | Xu et al. | 455/414.1 |
| 2011/0003587 A1 | 1/2011 | Belz et al. | |
| 2011/0103569 A1 | 5/2011 | Sutcliffe | |

FOREIGN PATENT DOCUMENTS

| | | |
|---|---|---|
| CN | 1688154 | 10/2005 |
| CN | 1805481 | 7/2006 |
| CN | 1835534 | 9/2006 |
| CN | 1859493 | 11/2006 |
| CN | 1980287 | 6/2007 |
| CN | 1984175 | 6/2007 |
| CN | 1988573 | 6/2007 |
| CN | 101043550 | 9/2007 |
| KR | 430337 | 5/2004 |
| KR | 20040102949 | 12/2004 |
| KR | 20040105517 | 12/2004 |
| KR | 20050078529 | 8/2005 |
| KR | 515892 | 9/2005 |
| KR | 20060014129 | 2/2006 |
| KR | 606154 | 8/2006 |
| KR | 636405 | 10/2006 |
| KR | 20070003313 | 1/2007 |
| KR | 20070012067 | 1/2007 |
| KR | 20070021514 | 2/2007 |
| KR | 20070028139 | 3/2007 |
| WO | 2006114036 | 11/2006 |
| WO | 2007019729 | 2/2007 |
| WO | 2007063058 | 6/2007 |

\* cited by examiner

METHOD, SYSTEM, AND APPARATUS FOR OVERRIDING A RING BACK SIGNAL

CROSS-REFERENCE TO RELATED APPLICATIONS

This application is a continuation of U.S. application Ser. No. 12/231,454 filed Sep. 3, 2008, now U.S. Pat. No. 8,204,200, the entire contents of which are hereby incorporated by reference.

FIELD OF THE INVENTION

This invention relates in general to communications networks, and more particularly to systems, apparatuses and methods for overriding a ring back signal.

BACKGROUND

Personalized ring-back tones (PRBT) are a mobile telecommunication service offered to mobile service subscribers. When a caller dials the number of a PRBT subscriber, the caller may hear a tune, sound, jingle, phrase, advertisement, etc., instead of the traditional switchboard ringtone. With the PRBT service, subscribers have yet another way to express their own individuality.

An early PRBT called Color Ring Back Tone (CRBT) was introduced by a South Korean company, Witco in May 2001 and started service with SK Telecom in South Korea from April 2002. Since then, numerous companies have supplied PRBT equipment for mobile phone and telecommunications companies. Many mobile operators now offer PRBT services to their customers.

Unfortunately, the subscribers' individual selections PRBT aren't always agreeable. For example, some of the PRBTs are weird, raspy, shrill, hoarse, offensive, and/or otherwise troublesome. However, in current systems the caller has no choice but to hear the subscribers' PRBT.

SUMMARY OF SOME EXAMPLE EMBODIMENTS OF THE INVENTION

In some example embodiments, the present invention discloses a system, apparatus and method for overriding a ring back signal: In one example, a method involves receiving a ring back signal at a communications apparatus from a communication network in response to a user-initiated connection request. The ring back signal is rendered to a user of the communications apparatus, and a user input is received at the communications device to override the ring back signal. An alternate output is rendered to the user in place of the ring back signal.

In other examples, the alternate output may include audio content and/or video content. The alternate output may be retrieved from the communication apparatus. The communication network may include a telephonic communication network, and the telephonic communication network may include at least one of a cellular network, a public switched telephone network, and a packet switched data network. In such a case, the connection request may span at least two of the cellular network, the public switched telephone network, and the packet switched data network.

In other examples, the method further involves receiving a call connect signal from the communication network in response to the user-initiated connection request and stopping the alternate output in response to the call connect signal. The ring back signal may include a personalized ring back tone.

In other examples, rendering the alternate output to the user in place of the ring back signal may involve selecting an application from a plurality of applications of the communications device and rendering the alternate output to the user via the selected application. In such a case, the selected application may be selected based on a context of the communications apparatus and/or a context of a target device to which the connection request is targeted. In other examples, the connection request may be targeted to establish a video call and/or the ring back signal may include a signal that is rendered visually.

In another example, an apparatus includes a processor configured to: a) receive a ring back signal from a communication network in response to a user-initiated connection request; b) render the ring back signal to a user of the apparatus; c) receive, via a user interface, a user input to override the ring back signal; and d) render an alternate output to the user in place of the ring back signal.

In another example, an computer-readable storage medium includes instructions which are executable by an apparatus for performing steps that include: a) receiving a ring back signal from a communications network in response to a user-initiated connection request; b) rendering the ring back signal to a user of the apparatus; c) receiving, via a user interface of the apparatus, a user input to override the ring back signal; and d) rendering an alternate output to the user in place of the ring back signal.

In another example, an apparatus includes: a) means for receiving a ring back signal from a communications network in response to a user-initiated connection request; b) means for rendering the ring back signal to a user of the apparatus; c) means for receiving a user input to override the ring back signal; and d) means for rendering an alternate output to the user in place of the ring back signal.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described representative examples of systems, apparatuses, and methods in accordance with the invention.

BRIEF DESCRIPTION OF THE DRAWINGS

The invention is described in connection with example embodiments illustrated in the following diagrams.

DETAILED DESCRIPTION OF EXAMPLE EMBODIMENTS OF THE INVENTION

In the following description of various example embodiments, reference is made to the accompanying drawings that form a part hereof, and in which is shown by way of illustration various example embodiments in which the invention may be practiced. It is to be understood that other embodiments may be utilized, as structural and operational changes may be made without departing from the scope of the present invention.

Generally, the present disclosure relates to personalized ring-back tones (PRBT) which are a personalized ring-back tone service where the caller hears tune, sound, jingle, or phrase instead of the traditional switchboard ringtone when he or she dials the number of a PRBT subscribers. Such ring back services may encompass other renderable media besides sound, including graphic and videos. A method, apparatus and system are described for screening personalized ring-back services and switching to other applications by the caller without help of a third party agent or service.

Example embodiments of the invention provide a way for a caller to screen a PRBT and switch to other applications when the caller doesn't like the PRBT. The user can make this switch alone without help from a third-party system or agent. These examples may incorporate a number features to accomplish this. First, a caller can use a local application instead of the traditional ring or PRBT when making a call. These applications can be installed on the client and configured by the user beforehand. Instead of the PRBT or traditional ring, the application can play something like local audio/video, weather, jokes, and radio/TV broadcasts, ISP—provided content, educational materials (e.g., language learning, trivia, etc.).

Another feature of the disclosed examples involves providing the caller with the ability to manually initiate application switching in the client. In this case, there may be no need for additional services subscriptions from a server to override a PRBT. Also in such a case, there may be no need to exchange parameters between the client, sending office, receiving office and/or the operation manager through the telecom network. Thus the caller can switch applications without the participation of callee or other third party entity.

Finally, another aspect of the disclosed examples is that the caller can make different judgment for the same phone number that uses different PRBT. For example, the callee may have multiple PRBT and may change them at anytime. In such a situation, the caller can, without subscribing in advance, block selected PRBTs of the same callee while listening to other PRBTs at the same number if so desired. No interesting PRBT need be missed, and the caller still need not be bothered by a troublesome PRBT.

Figure 1:
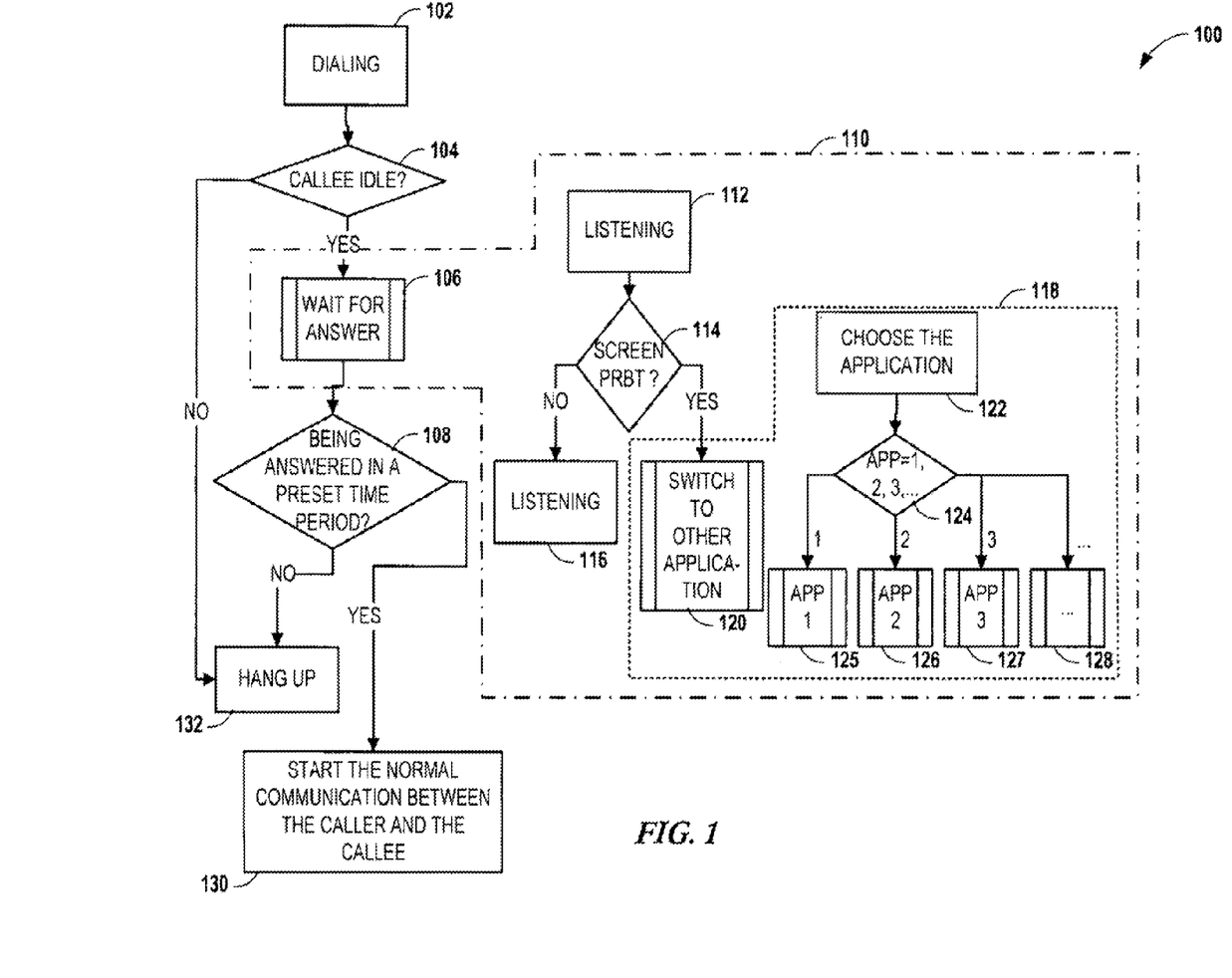
FIG. 1 is a flowchart illustrating a procedure for ring back tone screening according to an example embodiment of the invention.

In FIG. 1, a flowchart diagram 100 shows a procedure for ringtone switching according to an example embodiment of the invention. The caller initiates a call to a callee as indicated by dialing block 102. In this scenario, the callee has subscribed to PRBT services for a user terminal, such as for example a mobile terminal, and there are three possible states that the callee may be in at this time: a) the callee's terminal may be turned off; b) the callee's terminal may be turned on and in the idle state; and c) the callee is engaged in a conversation.

In the first case, the user terminal cannot be reached by the network because it does not answer a paging message. The user terminal does not inform the system about possible changes of location area, as it is inoperative as far as the network is concerned. In this case, the callee is simply considered detached from the system, e.g., international mobile station identity (IMSI) detached. In the second case, where the callee terminal is in an idle state, the system can page the callee successfully. This is the situation in which the callee is considered attached (IMSI attached). In the final case (callee busy), the radio network already has traffic channels allocated for the data flow to/from the terminal. In this last case, the callee may or may not be accessible, depending on details of the callee's subscription (e.g., call waiting).

The flowchart in FIG. 1 shows actions that occur when the callee is in idle state, as detected in block 104. However, these actions 104 may also be applicable to the busy state in some situations (e.g., call waiting enabled). When the callee is in the idle state, the caller; e.g., the user of the user terminal, will hear the PRBT when the caller is waiting 106 for answer. The PRBT application may be configured to keep playing until the callee answers the call, the callee refuses to answer the call, or the callee doesn't answer the call in a preset time period, as indicated by block 108.

During the caller's waiting period 106, the caller can switch to other applications from the PRBT via a user interface function of the calling terminal (e.g., pressing a preset button). This capability to override the PRBT with selected applications is generally indicated in FIG. 1 by the outlined area 110. While listening 112, the caller can decide 114 whether to screen the PRBT. If not, listening continues 116. If the caller decides 114 to screen the PRBT, an application switch occurs as indicated by area 118 and block 120. An application may be manually or automatically chosen 122, and based on the choice, a decision 124 is made of which of a plurality of applications 125-128 are used. The caller may have many choices about which applications 125-128 are made available and used. Numerous applications can be preset, and may act as local services and/or network services. The applications 125-128 may include, for example, radio, music player, picture player, video player, game, transducer output (e.g., vibration, flashing LED), etc. The applications 125-128 may behave similarly to the screened PRBT relative to the call attempt, such as terminating when the callee answers the call.

After the callee answers and the selected application 125-128 shuts down, the normal communications 130 take place between the caller and callee. If the callee refuses to answer the call or doesn't answer the call in a preset time period 108, the application 125-128 can be shutdown automatically and the call can be hung up 132. All of the application switching actions (e.g., actions 118) can be executed at the caller side according to user's choice and the information already available via various mobile communication systems, e.g., Global System For Mobile Communications (GSM). The illustrated procedures 100 need not bother the callee, nor affect the other parts of the mobile communications system besides the caller's user terminal, such as for example a Mobile Station (MS). Nor are changes required for other telephone networks such as the Public Switched Telephone Network (PSTN), packet switched networks (e.g., TCP/IP, UDP/IP), and other cellular network types.

Figure 2:
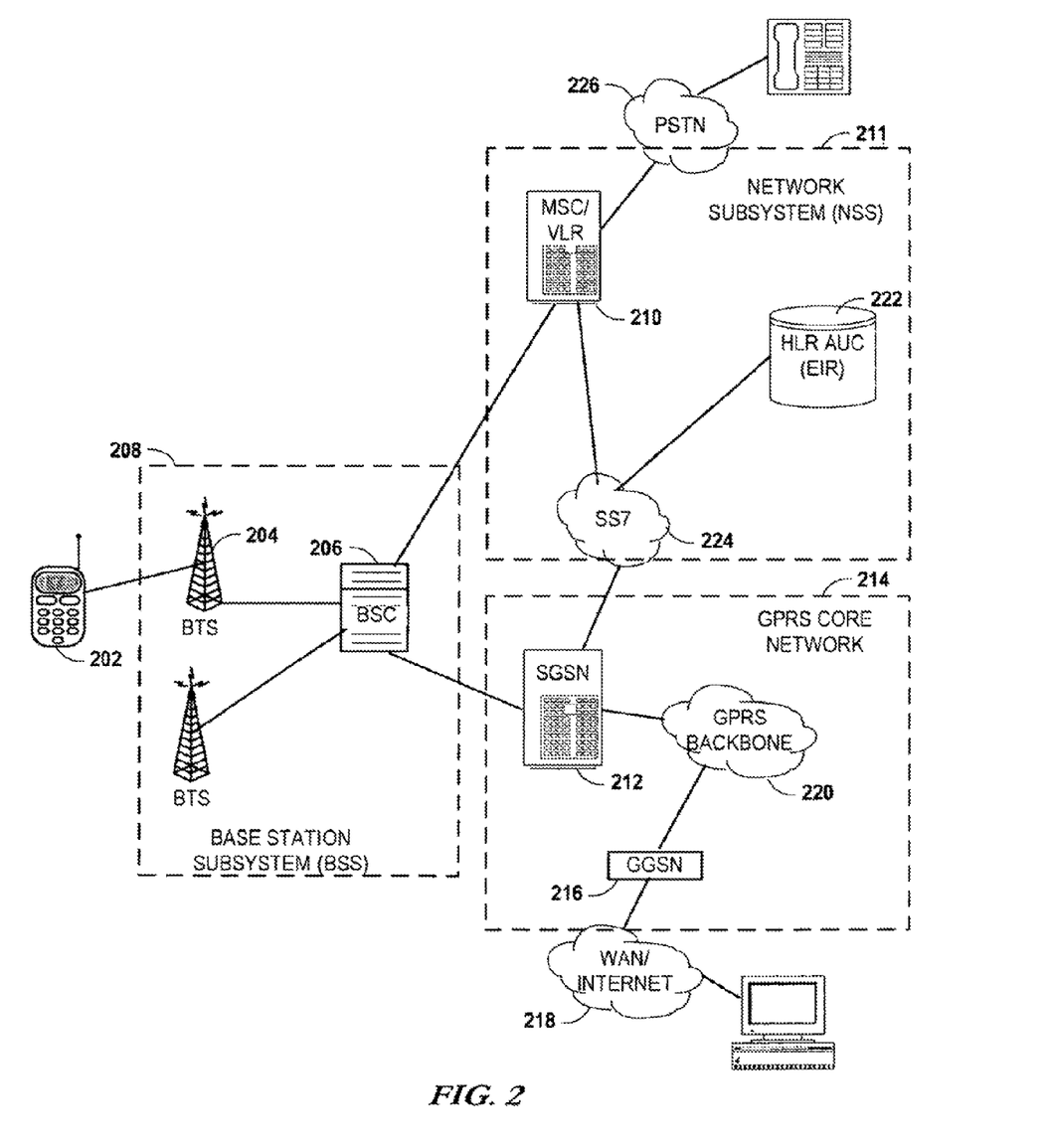
FIG. 2 is a block diagram illustrating a mobile telecommunications systems implementing ring hack screening according to an example embodiment of the invention.

In FIGS. 2-5, an example of screening personalized ring-back tone services in a GSM network is described. FIG. 2 is a block diagram of a GSM network 200 in which example embodiments of the invention may be employed. Generally, the concepts described can be employed within user terminal, such as for example a MS 202 (see, e.g., FIG. 6), and utilize signaling with other network components to enable ring back override. The MS 202 communicates with a Base Transceiver Station (BTS) 204 via an air interface. The BTS 204 is a component of a wireless network access infrastructure that terminates the air interface over which subscriber traffic is communicated to and from the MS 202. A Base Station Controller (BSC) 206 is a switching module that provides, among other things, handoff functions, and controls power levels in each BTS 204 of the Base Station System (BSS) 208. The BSC 206 controls the interface between a Mobile Switching Center Visitor Location Register (MSCNLR) 210 and BTS 204 in a GSM mobile wireless network, and thus controls one or more BTSs in the call set-up functions, signaling, and in the use of radio channels. The BSC 206 also controls the interface between a Serving GPRS Support Node (SGSN) 212 and the BTS 204 in the GPRS network 214, as described more fully below. Other BTS, BSC, and related mobile network components may also be associated with the network system.

GPRS Support Nodes (GSNs) are introduced into a GSM network in order to integrate GPRS into the existing GSM network, as represented by Network and Switching Subsystem (NSS) 211 which manages functions such as call forwarding, handover and switching. GSNs are responsible for the delivery and routing of data packets between MSs and external packet data network's (PDNs) as represented by Internet/WAN 218. The Serving GPRS Support Nodes (SGSN) 212 serves GPRS mobile by sending or receiving packets via the BSS 208, for example via the BSC 206 in the context of GSM systems. The SGSN 212 is responsible for the delivery of data packets to and from the mobile stations within its service area, and performs packet routing and transfer, mobility management, logical link management, authentication, charging functions, etc. In the example GPRS embodiment shown in FIG. 2, a location register of the SGSN 212 stores location information such as the current cell and Visiting Location Register (VLR) 210 associated with the MS 202, as well as user profiles such as the IMSI of all GPRS users registered with this SGSN 212.

Another network element/node introduced in the GPRS context is the Gateway GPRS Support Node (GGSN) 216 or other gateway, which serves as a gateway between the GPRS network 214 and a packet-switched data network, such as data network 218. This gateway 216 allows mobile subscribers to access the data network 218 such as the Internet or specified private IP networks. The connection between the GGSN 216 and the data network 218 is generally enabled through a standard protocol, such as the Internet Protocol (IP). GSNs such as the SGSN 212 and GGSN 216 are connected via a GPRS backbone network 220. Within this backbone, packets are encapsulated and transmitted or "tunneled," such as via the GPRS Tunneling Protocol (GTP).

The MSC functionality of the MSCNLR 210 includes providing switching services and controlling calls between telephone and data systems, switching voice traffic from the wireless network to the landline network if the call is a mobile-to-landline call, or alternatively switching to another MSC if the call is a mobile-to-mobile call. The MSC also provides the mobility functions for the network, and serves as the hub for multiple BTSs. Generally, it is the MISC that provides mobility management for subscribers, in order to register subscribers, and authenticate and authorize services and access for subscribers. The MSC uses the information stored in its respective HLR to authenticate and register the subscriber by storing permanent subscriber information including the service profile, the current location of mobile stations, and activity status of the mobile user. The VLR functionality of the MSCNLR 210 includes a database that may be maintained by the MSC to keep track of all the visiting mobile stations within a mobile telephony system.

The NSS 211 interfaces with a PSTN 226 via the SS7 signaling protocol, also represented as SS7 network 224. The SS7 network 224 is a system on the PSTN 226 that performs out-of-band signaling in support of the call establishment, billing, routing, and information exchange functions of the PSTN 226. When message communications are performed, the HLR 222 or analogous database is queried to obtain certain information. The HLR 222 represents a database that stores and manages subscriptions, including a subscriber's service profile, location information, activity status, etc., and is maintained by one or more service providers for their respective subscribers. For example, When a mobile subscriber roams into a new VLR (not shown), the new VLR automatically determines that it must update the HLR 222 with the new location information. This update is done using a Location Update Request Message routed to the HLR 222 through the SS7 network 224. The HLR 222 responds with a message that informs the new VLR whether the subscriber should be provided service in the new location.

Outgoing calls from a GSM userbegin when the user dials a number according to the Man-Machine Interface (MMI) of a MS, and presses SEND. The MS firstly requests a radio channel. The local MSC/VLR authenticates the mobile, using authentication data previously obtained from the relevant HLR, and establishes a radio channel with ciphering. Then the call is routed by the MSC/VLR in accordance with the dialed number, and the MSCNLR maintains charging records accordingly.

Figure 3:
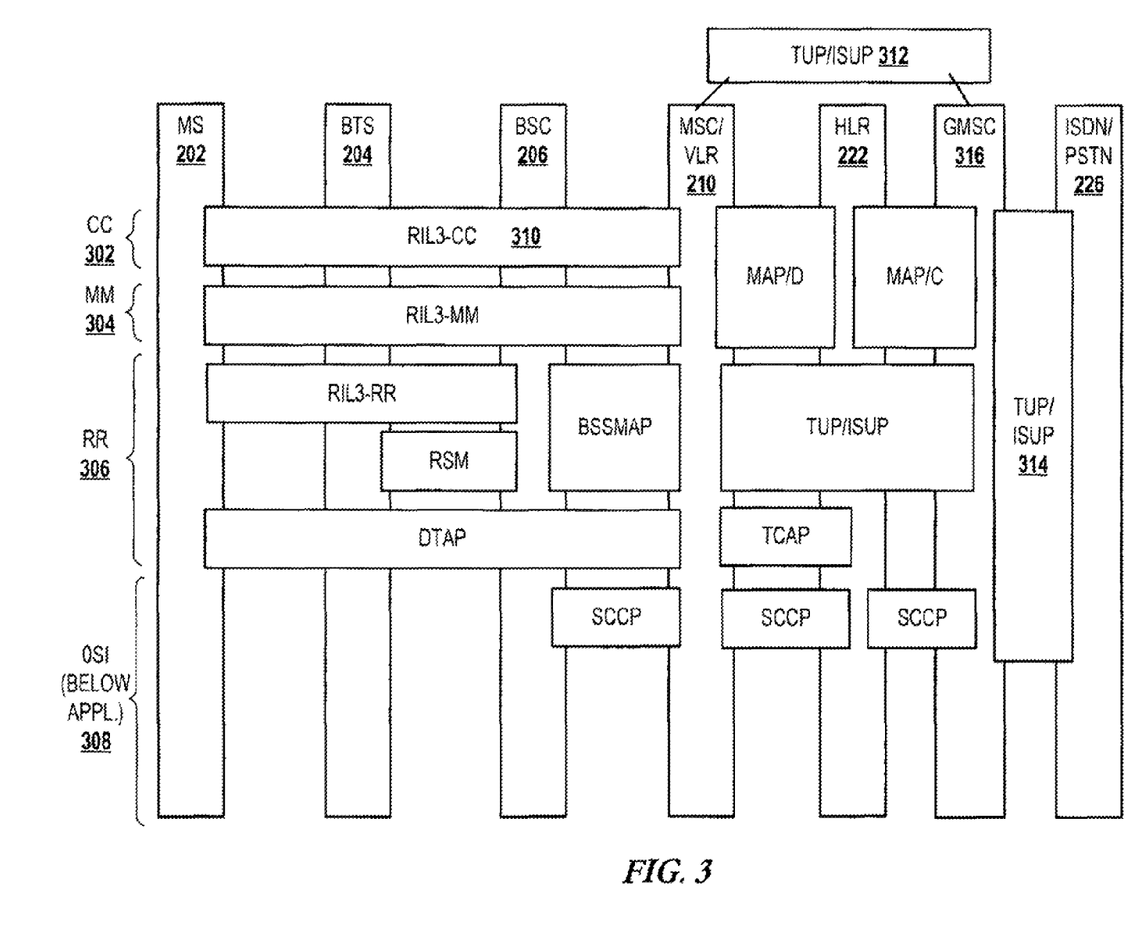
FIG. 3 is a block diagram illustrating various signaling protocols used in ring back screening according to an example embodiment of the invention.

In reference now to FIG. 3, a block diagram 300 illustrates protocols used in communicating between network components according to an example embodiment of the invention. The acronyms used in FIG. 3 are explained in Table 1 below. The diagram 300 is divided into layers that generally represent the Open Systems Interconnection (OSI) Basic Reference Model. For example, a set of GSM-specific layers, the call control layer 302, mobility management layer 304, and radio resource layer 306, generally all correspond to the OSI application layer in this context. The portion 308 generally corresponds to the OSI layers below the application layer (e.g., presentation, session, transport, network, data link, and physical layers). The full listing of protocols associated with layers 308 is omitted from FIG. 3 for purposes of clarity.

TABLE 1

List of Acronyms used in FIG. 3

| Acronym | Definition |
| --- | --- |
| RIL3 | Radio Interface Layer 3 |
| CM | Call Management |
| CC | Call Control |
| MM | Mobility Management |
| RR | Radio Resource |
| MAP | Mobility/Management Application Part |
| TCAP | Transaction Capabilities Application Part |
| SCCP | Signaling Connection Control Part |
| TUP | Telephone User Part |
| ISUP | ISDN User Part |
| GMSC | GatewayMSC |
| DTAP | Direct Transfer Application Part for GSM |
| RSM | Radio Subsystem Management |

Of interest in the following discussions are call control communication protocols in layer 302, including a RIL3-CC 310 which is a GSM protocol used for communicating between the BSS 208 and the MSCNLR 210. When communicating with the ISDN/PSTN 226, the MSCNLR uses SS7 signaling via a GMSC 316, as represented by TUP/ISUP blocks 312 and 314. The GMSC 316 provides an edge function within a mobile network, terminating the PSTN signaling and traffic formats and converting the signaling/traffic to protocols employed in the mobile network. For mobile terminated calls, it interacts with the HLR 222 to obtain routing information.

It should be noted that the SS7 application layer has several sub layers specific to the GSM system. RIL3-RR management protocols establish and release connections between an MS and various BSC's for the duration of a call despite user movement. The radio subsystem management protocol provides RR functions between the BTS and BSC. The DTAP protocols provide RR messages between the MS and MSC. The base BSSMAP protocols provide RR messages between the BSC and MSC. The distinction between DTAP and BSS-MAP is provided by a small "distribution" protocol below them. RIL3-MM protocols deal with MS location management (cell assignment, location updating, paging for coming calls, etc.) and security aspects of the system (authentication, user identity protection, etc.). RIL3 call control management protocols deal with call control, supplementary services, and short messages. Mobility management and call control functions reside in the MSC. Thus, all CC and MM messagesate interpreted neither by the BSC nor by the BTS. They are transparently conveyed to its corresponding entity within the MSC. It will be appreciated that the description of the GSM network system is merely example, and the concepts described herein may be applicable to any other communication network.

Figure 4:
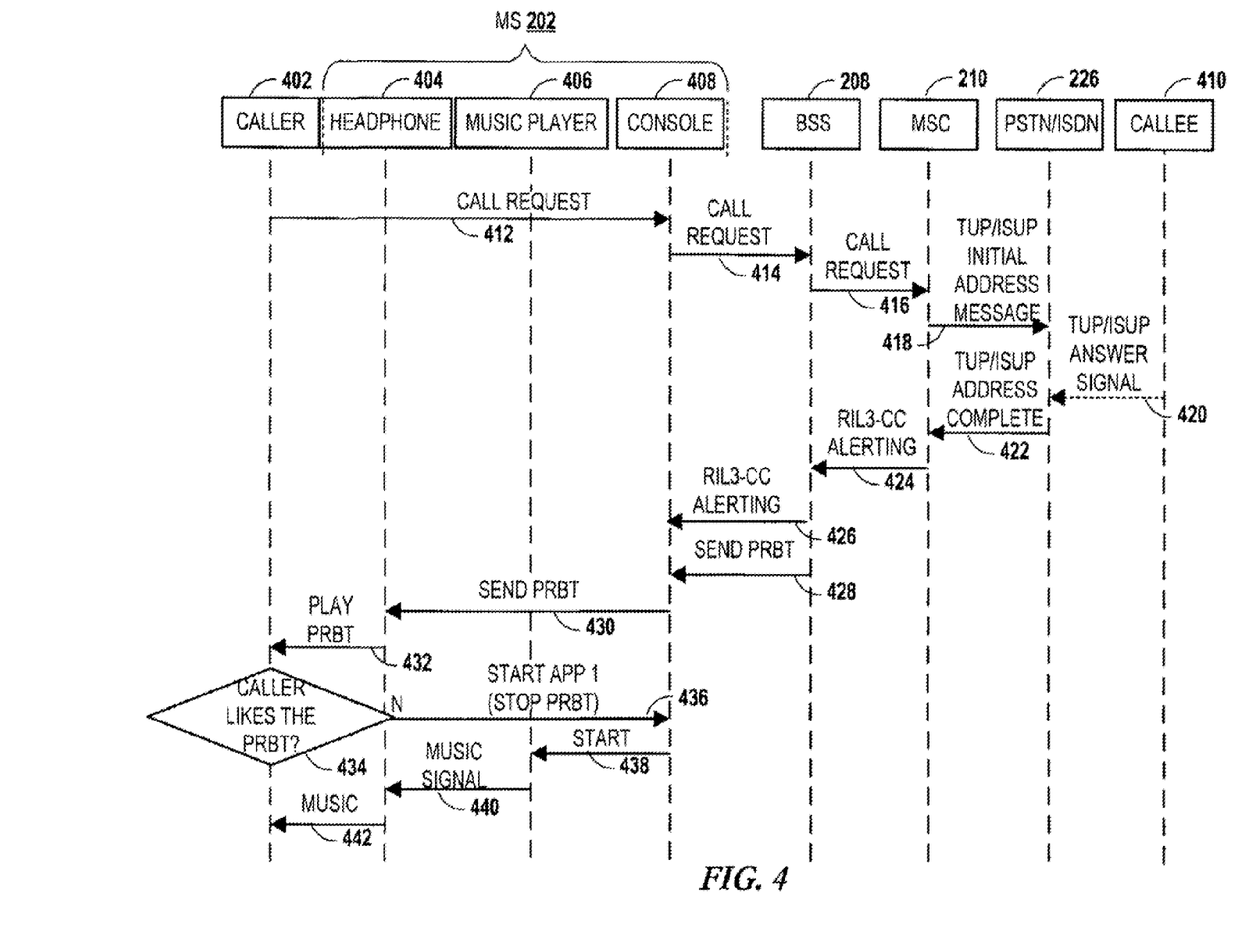
FIGS. 4 and 5 illustrate a sequence diagram for ring back screening according to an example embodiment of the invention and FIG. 6 is a block diagram of a user device according to an example embodiment of the invention.

With the general description provided above, an example of PRBT screening by playing local music can now be described in relation to FIGS. 4 and 5. Referring first to FIG. 4, a sequence diagram shows operations of a terminal 202 in screening PRBT according to example embodiments of the invention. A user 402 interfaces with the terminal 202 via headphones 404. The terminal 202 also includes a music player 406 and console 408. The console 408 provides telephony functions such as call control and media management. The terminal 202 in this example is a mobile station designed to operate on a GSM network, as indicated by BSS 208, MSC 210, which themselves can communicate with a PSTN/ISDN network 226 as described in relation to FIGS. 2 and 3. It will be appreciated that the description of a GSM MS 202 is merely example, and the concepts described herein may be applicable to any user terminal operable via fixed and/or mobile communications networks.

In this example, the caller 402 wishes to contact a callee 410, as indicated by Call Requests 412, 414, and 416. At the MSC 210, the Call Request is converted to an SS7 signaling message, for example a TUP/ISUP Address Message 418. In response, the cal lee's device sends a TUP/ISUP answer signal 420 which is conveyed to the MSC 210 as TUP/ISUP Address Complete Message 422. The MSC 210 converts the SS7 message 422 to an RIL3-CC Alerting Message 424 which is forwarded 426 to the console 408. In conjunction with the alerting message 426, the BSS 208 sends a PRBT 428 that is specific to callee 410.

The PRBT 428 may originate from a PRBT server (not shown) located on the mobile network or PSTN/ISDN 226. Generally, the PRBT 428 may be selected when the caller is first identified during call setup, where the routing and subscription data for the callee 410 is determined. Assuming the callee 410 has subscribed to a PRBT service; the PBRT is identified and used for the remaining steps in the first leg of call setup. The PRBT 428 may be received via normal signaling and data channels that would carry the default ring back tone, except that the default ring back tope is replaced with data originating from the PRBT server.

After receiving the PRBT 428, the console sends 430 the PRBT for rendering on the headphones 404, and the PRIBT is played 432 to the caller 402. Here the caller 402 may decide 434 whether or not the ringtone is desirable. If the ringtone is acceptable, the call proceeds as normal. If the ringtone is not acceptable, the caller 402 signals 436 to stop the PRBT and start a local application. This signal 436 may be performed using any user interface mechanisms associated with the terminal 202, including a dedicated button, special key press combinations, voice inputs, gesturing, etc. In response to the signal 436, the console blocks the PRBT (not shown) and starts 438 an alternate output, such as for example the application, in this case the music player 406. The player 406 sends the music signal 440 to the headphones 404 where it is rendered as music 442 to the caller 402. The caller 402 will continue to hear the music 442 until the call attempt terminates, as will be discussed in greater detail in the continuation of the sequence diagram in FIG. 5.

Figure 5:
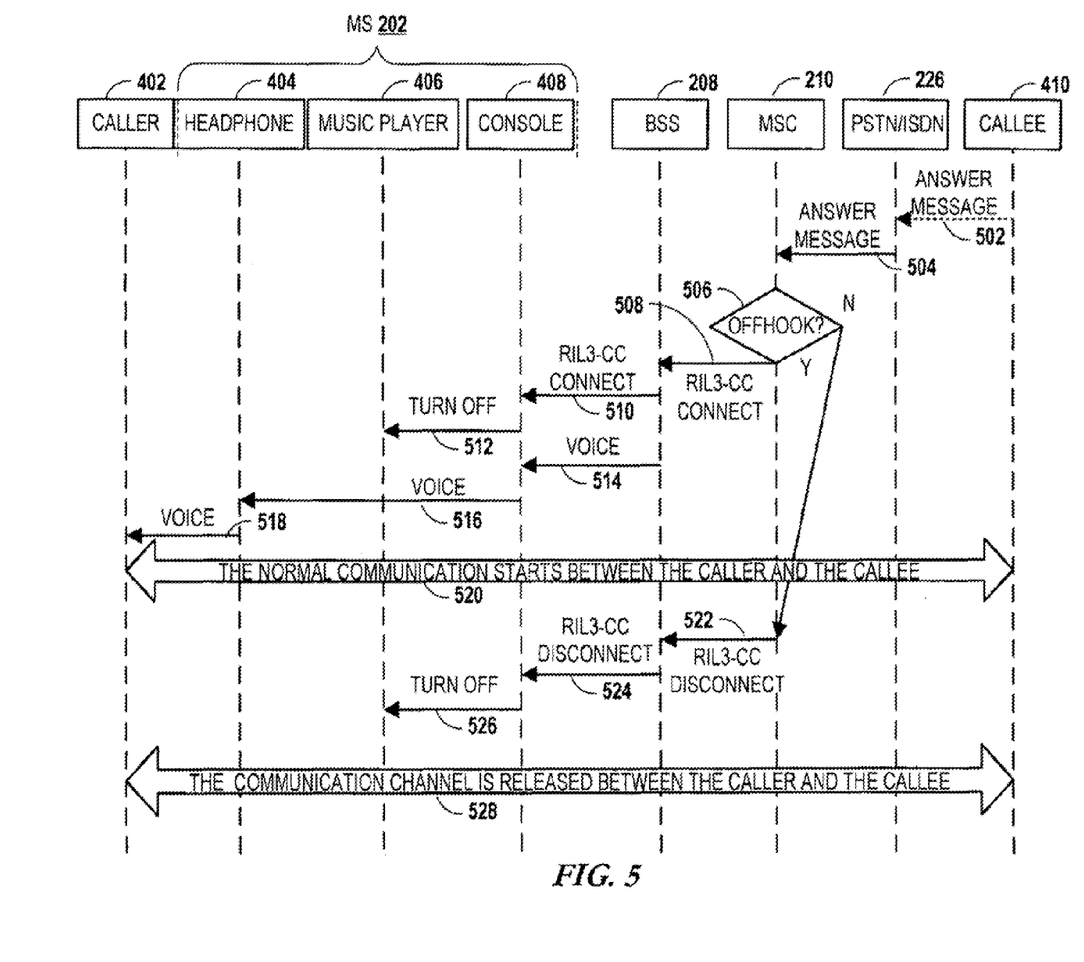

Turning now to FIG. 5, illustrating an example embodiment of the invention, the caller 402 is still waiting for an answer by listening to the music player 406 (e.g., music 442 as shown in FIG. 4), when the callee answers the initial connection request message (e.g., message 418 seen in FIG. 4) as indicated by answer message 502. The PSTN 226 forwards 504 the answer message to MSC 210. The answer message 504 may indicate a number of states, including offhook (e.g., user has answered), refuse to answer, or no answer. If the MSC determines 506 the state is offhook, a call connect signal, such as for example a RIL3-CC Connect Message 508, may be sent to the BSS 208, which forwards 510 the signal to the console 408.

In response to the call connect signal, such as for example the connect signal 510, the console turns off 512 the music player 406, giving the caller 402 an audible indication of some sort of change in connection status. The console 408 also receives 514 voice transmissions from the callee 410, which is then sent 516, 518 to the caller, and the normal communications 520 of the call commences. Referring back to decision block 506, if the answer message 504 indicates a state other than offhook, a call rejected signal, such as for example RIL3-CC disconnect 522, 524 is relayed to the console 408. In response to this disconnect signal 524, the console 408 turns off 526 the music player 406, again providing an audible indication of change in connection status. In this case, the change results in the communication channel being released 528, and the terminal 202 may take other appropriate actions, such as returning call software and user interface to reflect a "ready" state.

Although a specific example of ring back signal screening has been described in FIGS. 4 and 5, those skilled in the art will appreciate that many variations are possible in light of these teachings. For example, the callee 410 may be using a MS terminal that operates on a GSM network similar to the caller 402. In such a case, all of the signaling between the MSC 210 and callee 410 may utilize GSM specific signaling protocols. A similar situation may occur when the callee 410 is on a different cellular network, such as Code Division Multiple Access (CDMA) network, Universal Mobile Telecommunications System (UMTS), CDMA2000, Ultra Mobile Broadband(UMB), Wideband CDMA (WCDMA), $3^{rd}$ Generation (3G), 4th Generation (4G), Long Term Evolution (LTE), and/or the like. Such a situation may also occur where the callee 410 is using packet network telephony such as VoIP. In the latter case, the signaling between the MSC 210 and callee 410 may utilize the Session Initiation Protocol (SIP) or similar VoIP call control protocol instead of the illustrated SS7 signaling over local area network (LAN), wireless LAN (WLAN), and/or the like. Further, the concepts may also be similarly to callers and callees operating on any of UMTS, CDMA, CDMA2000, UMB, WCDMA, 3G, 4G, LTE networks, and/or the like. In such a case, the signaling to the MS 202 may use call control protocols appropriate to those network standards instead of the indicated RIL3-CC signaling.

In another alternative, the caller 402 may be operating on the PSTN 226. In such a case, the signal interception functions of the console 406 may be performed by a service component of the PSTN 226, because the call control signals may not be passed from the PSTN to legacy telephone equipment. In such a case, the PSTN service component may intercept user-initiated screening signals (e.g., signal 436 in FIG. 4) by way of touch tone or voice inputs to the telephone receiver. Such receiver equipment may still utilize special controls for sending this override signal (e.g., dedicated key) and logic within the phone can maps a key press of the special key to the appropriate touch tone combination.

In another variation, the user's decision 434 need not be an immediate decision to screen the PRBT. For example, such screening may occur automatically in response to a previously set configuration that takes into account context of the caller or callee. For example, the caller may designate that certain callees have the PRBT screened, but such screening is optional for all others. In other cases, system events (e.g., passage of time) may cause automatic PRBT screening. Such an implementation may be useful, for example, in fax machines or modems which may become confused by non-standard ring back tones. In such a case, the equipment could send a termination signal 436 before, during, or just after connection request (e.g., request 412), or such equipment could send the signal 436 after a certain timeout where no recognized ring back tone or handshake tone is detected.

Although the ring back signal (e.g., 432) is depicted as an audible signal, it. will be appreciated that the invention may be equally applicable to other forms of customized ring back signals. For example, where the call request 412 is targeted to establish a video call, the ring back signal 432 may be in the form of a still graphic or video. Such a visual ring back may also be available for voice calls, e.g., multimedia ring back tones and multimedia caller ID.

Many types of apparatuses may be used for screening ring back signals as described herein. For example, users are increasingly using mobile telephones as their primary or secondary telephones, and are also using such devices to. access alternate telephony systems,. such as Voice over IP (VoIP) networks. In reference now to FIG. 6, an example embodiment is illustrated of a representative user computing arrangement 600 capable of carrying out operations in accordance with an example embodiments of the invention. Those skilled in the art will appreciate that the example user computing arrangement 600 is merely representative of general functions that may be associated with such user apparatuses, and also that landline computing and telephony systems similarly include computing circuitry to perform such operations. The user computing arrangement 600 may be for example a mobile computing arrangement, mobile phone, mobile communication device, mobile computer, laptop computer, desk top computer, phone device, video phone, conference phone, television apparatus, digital video recorder (DVR), set-top box (STB), radio apparatus, audio/video player, game device, positioning device, digital camera/camcorder, and/or the like, or any combination thereof. Further the user computing arrangement 600 may be similar to the user terminal apparatus 202 in FIGS. 2, 3, 4 and 5.

Figure 6:
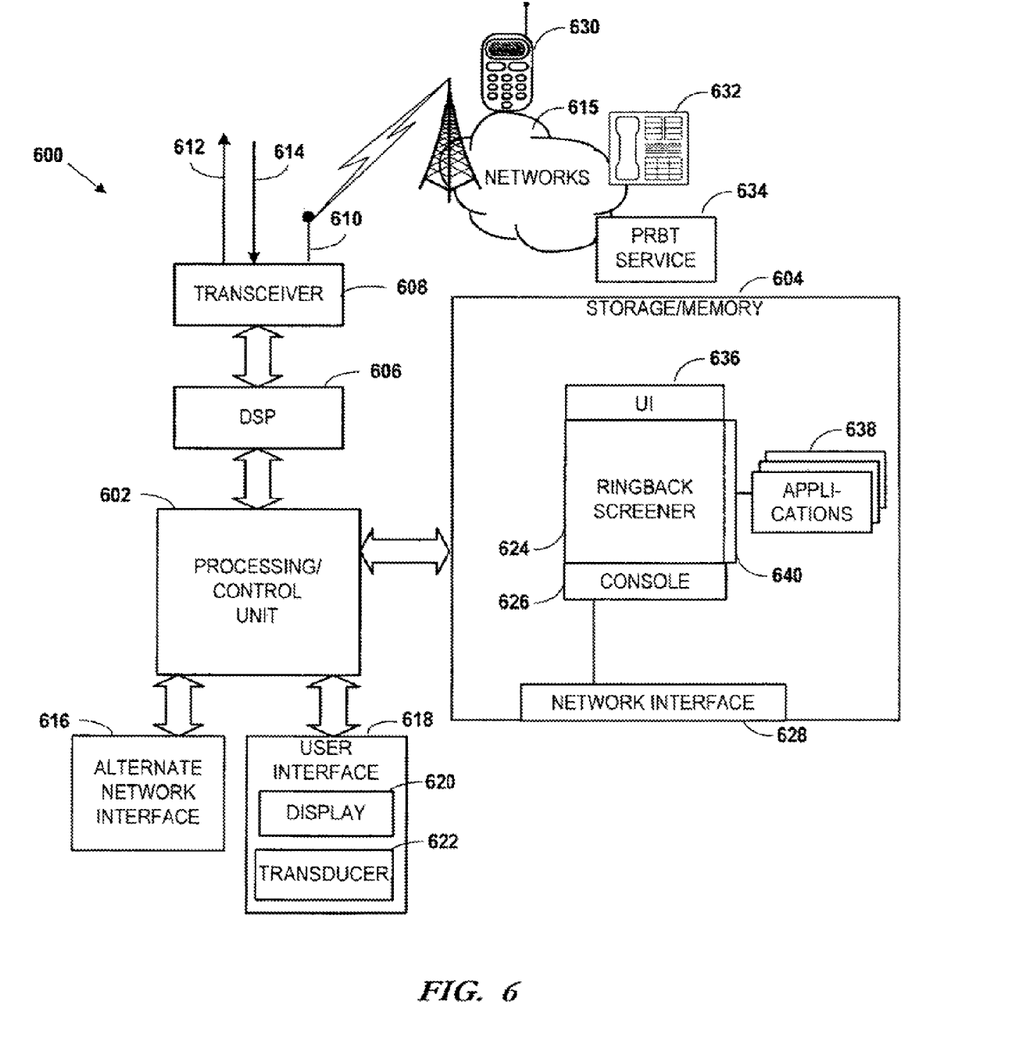

The processing unit 602 controls the basic functions of the arrangement 600. Those functions associated may be included as instructions stored in a program storage/memory 604. In an example embodiment of the invention, the program modules associated with the storage/memory 604 are stored in non-volatile electrically-erasable, programmable read-only memory (EEPROM), flash read-only memory (ROM), hard-drive, etc. so that the information is not lost upon power down of the mobile terminal. The relevant software for carrying out mobile terminal operations in accordance with the present invention may also be transmitted to the mobile computing arrangement 600 via data signals, such as being downloaded electronically via one or more networks, such as the Internet and intermediate wireless network (s}.

The mobile computing arrangement 600 may include hardware and software components coupled to the processing/control unit 602 for performing network data exchanges. The mobile computing arrangement 600 may include multiple network interfaces for maintaining any combination of wired or wireless data connections. The illustrated mobile computing arrangement 600 includes wireless data transmission circuitry for performing network data exchanges. This wireless circuitry includes a digital signal processor (DSP) 606 employed to perform a variety of functions, including analog-to-digital (AID) conversion, digital-to-analog (D/A) conversion, speech coding/decoding, encryption/decryption, error detection and correction, bit stream translation, filtering, etc. A transceiver 608, generally coupled to an antenna 610, transmits the outgoing radio signals 612 and receives the incoming radio signals 614 associated with the wireless device. These components may enable the arrangement 600 to join in one or more communication networks 615, including mobile service provider networks, local networks, and public networks such as the Internet and the PSTN.

The mobile computing arrangement 600 may also include an alternate network/data interface 616 coupled to the processing/control unit 602. The alternate network/data interface 616 may include the ability to communicate via secondary data paths using any manner of data transmission medium, including wired and wireless mediums. Examples of alternate network/data interfaces 616 include USB, Bluetooth, Ethernet, 602.11 Wi-Fi, IRDA, Ultra Wide Band, WiBree, etc. These alternate interfaces 616 may also be capable of communicating via the networks 615, or via direct and/or peer-to-peer communications links.

The processor 602 is also coupled to user-interface hardware 618 associated with the mobile terminal. The user-interface 618 of the mobile terminal may include, for example, a display 620 such as a liquid crystal display and a transducer 622. The transducer 622 may include any input device capable of receiving user inputs. The transducer 622 may also include sensing devices capable of producing media, such as any combination of text, still pictures, video, sound, etc. Other user-interface hardware/software may be included in the interface 618, such as keypads, speakers, microphones, voice commands, switches, touch pad/screen, pointing devices, trackball, joystick, vibration generators, lights, etc. These and other user-interface components are coupled to the processor 602 as is known in the art.

The program storage/memory 604 includes operating systems for carrying out functions and applications associated with functions on the mobile computing arrangement 600. The program storage 604 may include one or more of read-only memory (ROM), flash ROM, programmable and/or erasable ROM, random access memory (RAM), subscriber interface module (SIM), wireless interface module (WIM), smart card, hard drive, or other removable memory device. The storage/memory 604 of the mobile computing arrangement 600 may also include software modules for performing functions according to example embodiments of the present invention.

For example, the program storage/memory 604 includes a ring back screener component 624 that is configured to monitor telephone connection attempts via a control console 626. The control console 626 may include any combination of PSTN, cellular, and VoIP call control functions, and can communicate with networks 615 via one or more network interfaces 628. The network communications may include media sessions (e.g., voice, video, telemetry, conferencing, etc.) with mobile terminals 630 and/or other telephone equipment 632. Users of these target devices 630, 632 may subscribe to a PBRT service 634.

In response to a user of the arrangement 600 calling a network endpoint 630, 632, the PRBT service 634 may cause a personalized ring back signal to be rendered to the user via the user interface 618. The screener 624 includes a user interface 636 that accepts user inputs from the user interface hardware 618 and causes the ring back signal to be replaced with signals from one or more selected applications 638. The console 626 monitors the state of the connection attempt, and turns off the selected application 638 as appropriate, e.g., when the call attempt is refused or accepted. These communications between the screener 624 and applications 638 may be facilitated by way of an application program interface (API) that may be part of the screener component 624, applications 638, and/or operating system and associated utilities.

Besides receiving the user-initiated screening signal, the user interface 636 may also facilitate user configuration of functions of the screener component 624. For example, the component 624 may select certain applications 638 based on certain user-defined conditions. Those user-defined conditions may include, but are not limited to callee identity, composition of ring back signal, network used by the arrangement 600, network used by callee, time of day, type of call (e.g., video versus voice), hardware configuration (e.g., use of headset), location of the user and arrangement 600, power state of the arrangement 600, etc.

The illustrated applications 638 may include locally executing applications as described above (e.g., local media renderer 406 shown in FIGS. 4-5). In other example embodiments, the applications 638 may include one or more processes that use remote content and/or execute remotely. For example, such remote applications may provide ring-tone-override content over different connections and/or networks, such as television, radio, video and/or audio transmission (e.g., broadcasting/multicasting/unicasting) over wireless and/or wireline channels. It will be appreciated that the example embodiments shown in FIGS. 1-5 may include adaptations to facilitate communicating with such an external application. For example, the signals 436, 438, and 440 in FIG. 4 and signals 512 and 526 in FIG. 5 may utilize some combination of local (e.g., on-device) signaling and network signaling to facilitate overriding a PRBT with an output from a remote source. Such remote source may include content/services available via networks, broadcast/multicast/unicast transmitters, peer devices, etc.

The mobile computing arrangement 600 of FIG. 6 is provided as a representative example of a computing environment in which the principles of the present invention may be applied. From the description provided herein, those skilled in the art will appreciate that the present invention is equally applicable in a variety of other currently known and future mobile and landline computing environments. For example, desktop and server computing devices similarly include a processor, memory, a user interface, and data communication circuitry. Thus, the present invention is applicable in any known computing structure where data may be communicated via a network.

The foregoing description of the example embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. A method, comprising:
    receiving a ring back signal at a communications apparatus from a communication network in response to a user-initiated connection request;
    overriding the ring back signal; and
    rendering an alternate output to a user via a preconfigured user selected application in place of the ring back signal, wherein the selected application is from a plurality of applications of the communications apparatus,
    further wherein the selected application is based on a context of one of the communications apparatus and a target device to which the connection request is targeted.

2. The method of claim 1, wherein the context is an identity of a target device user.

3. The method of claim 1, wherein the alternate output comprises video content.

4. The method of claim 1, wherein the alternate output is retrieved from the communications apparatus.

5. The method of claim 1, wherein the communication network comprises a telephonic communication network.

6. The method of claim 5, wherein the telephonic communication network comprises at least one of a cellular network, a public switched telephone network, and a packet switched data network.

7. The method of claim 6, wherein the connection request spans at least two of the cellular network, the public switched telephone network, and the packet switched data network.

8. The method of claim 1, further comprising:
    receiving a call connect signal from the communication network in response to the user-initiated connection request; and
    stopping the alternate output in response to the call connect signal.

9. The method of claim 1, wherein the ring back signal comprises a personalized ring back tone.

10. The method of claim 1, wherein the context is a network used by the target device.

11. The method of claim 1, wherein the connection request is targeted to establish a video call.

12. The method of claim 1, wherein the ring back signal comprises a signal that is rendered visually.

13. An apparatus comprising:
    at least one processor; and
    at least one memory including computer program code for one or more programs, the at least one memory and the computer program code configured to, with the at least one processor cause the apparatus to:
    render a ring back signal to a user of the apparatus in response to a user-initiated connection request;
    override the ring back signal;
    render an alternate output to the user via a preconfigured user selected application in place of the ring back signal, wherein the selected application is from a plurality of applications of the apparatus, and further wherein the selected application is based on a context of one of the apparatus and a target device to which the connection request is targeted.

14. The apparatus of claim 13, wherein the at least one memory and the computer program code are configured to, with the at least one processor, cause the apparatus to further stop the alternate output in response to a call connect signal received by the apparatus from a communication network in response to the user-initiated connection request.

15. The apparatus of claim 14, wherein the ring back signal comprises a personalized ring back tone.

16. The apparatus of claim 13, wherein the context is an identity of a target device user.

17. The apparatus of claim 13, wherein the alternate output comprises audio content.

18. The apparatus of claim 13, wherein the alternate output comprises video content.

19. The apparatus of claim 13, wherein the alternate output is retrieved from the apparatus.

20. The apparatus of claim 13, wherein the ring back signal comprises a personalized ring back tone.

21. The apparatus of claim 13, wherein the ring back signal is from a communication network which comprises at least one of a cellular network, a public switched telephone network, and a packet switched data network.

22. A non-transitory computer-readable storage medium comprising:
   instructions which are executable by an apparatus for performing steps that include:
      receiving a ring back signal from a communications network in response to a user-initiated connection request;
      overriding the ring back signal; and
      rendering an alternate output to a user via a preconfigured user selected application in place of the ring back signal, wherein the selected application is from a plurality of applications of the apparatus, further wherein the selected application is based on a context of one of the apparatus and a target device to which the connection request is targeted.

23. The non-transitory computer-readable storage medium of claim 22, wherein rendering the alternate output renders the alternate output to head phones of the user.

24. An apparatus comprising:
   means for receiving a ring back signal from a communications network in response to a user-initiated connection request;
   means for overriding the ring back signal; and
   means for rendering an alternate output to a user via a preconfigured user selected application in place of the ring back signal, wherein the selected application is from a plurality of applications of the apparatus, and further wherein the selected application is based on a context of one of the apparatus and a target device to which the connection request is targeted.

25. The apparatus of claim 24, wherein the means for rendering an alternate output renders the alternate output to head phones of the user.

* * * * *